(12) United States Patent
Yasukawa et al.

(10) Patent No.: US 11,582,637 B2
(45) Date of Patent: Feb. 14, 2023

(54) USER EQUIPMENT AND COMMUNICATION METHOD

(71) Applicant: NTT DOCOMO, INC., Tokyo (JP)

(72) Inventors: Shimpei Yasukawa, Tokyo (JP); Kazuki Takeda, Tokyo (JP); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 389 days.

(21) Appl. No.: 16/089,311

(22) PCT Filed: Mar. 8, 2017

(86) PCT No.: PCT/JP2017/009227
§ 371 (c)(1),
(2) Date: Sep. 27, 2018

(87) PCT Pub. No.: WO2017/169589
PCT Pub. Date: Oct. 5, 2017

(65) Prior Publication Data
US 2020/0305177 A1 Sep. 24, 2020

(30) Foreign Application Priority Data
Mar. 31, 2016 (JP) .............................. JP2016-073463

(51) Int. Cl.
*H04L 1/00* (2006.01)
*H04L 1/18* (2006.01)
(Continued)

(52) U.S. Cl.
CPC ........... *H04W 28/04* (2013.01); *H04L 1/0057* (2013.01); *H04L 1/0075* (2013.01);
(Continued)

(58) Field of Classification Search
CPC . H04J 11/0069–0093; H04J 2011/0003–0096; H04L 1/0001–1896;
(Continued)

(56) References Cited

U.S. PATENT DOCUMENTS

2013/0250869 A1* 9/2013 Eriksson ........... H04W 72/1231
2014/0177491 A1* 6/2014 Hao ....................... H04L 1/1864
(Continued)

FOREIGN PATENT DOCUMENTS

| JP | 2016-503611 A | 2/2016 |
|----|---------------|--------|
| WO | 2012/020954 A1 | 2/2012 |

(Continued)

OTHER PUBLICATIONS

Extended European Search Report issued in counterpart European Patent Application No. 17774134.5, dated Oct. 21, 2019 (11 Pages).
(Continued)

*Primary Examiner* — Timothy J Weidner
(74) *Attorney, Agent, or Firm* — Osha Bergman Watanabe & Burton LLP

(57) ABSTRACT

A user equipment that is provided in a wireless communication system including a base station and the user equipment includes an acquisition unit that acquires information indicating a resource position where a downlink data channel is mapped or a resource position where an uplink data channel is mapped in a radio frame and a timing when an HARQ response to downlink data is transmitted from the user equipment or a timing when an HARQ response to uplink data is received from the base station and a communication unit that transmits an HARQ response to downlink data received by the downlink data channel at a timing when the HARQ response to the downlink data is transmitted and receives an HARQ response to data transmitted by the uplink data channel or retransmission data scheduling infor-
(Continued)

mation at a timing when the HARQ response to the uplink data is received.

9 Claims, 17 Drawing Sheets

(51) Int. Cl.
| | | |
|---|---|---|
| *H04L 5/00* | (2006.01) | |
| *H04W 8/24* | (2009.01) | |
| *H04W 28/04* | (2009.01) | |
| *H04W 28/06* | (2009.01) | |
| *H04W 72/04* | (2009.01) | |
| *H04W 72/12* | (2009.01) | |
| *H04W 72/14* | (2009.01) | |
| *H04W 84/02* | (2009.01) | |
| *H04W 88/02* | (2009.01) | |
| *H04W 88/08* | (2009.01) | |
| *H04W 92/02* | (2009.01) | |
| *H04W 92/10* | (2009.01) | |
| *H04L 1/1812* | (2023.01) | |
| *H04L 1/1829* | (2023.01) | |
| *H04W 72/0446* | (2023.01) | |
| *H04W 72/044* | (2023.01) | |
| *H04W 72/1263* | (2023.01) | |

(52) U.S. Cl.
CPC .......... *H04L 1/1819* (2013.01); *H04L 1/1835* (2013.01); *H04L 1/1854* (2013.01); *H04L 1/1861* (2013.01); *H04L 5/0051* (2013.01); *H04L 5/0055* (2013.01); *H04W 8/24* (2013.01); *H04W 28/065* (2013.01); *H04W 72/042* (2013.01); *H04W 72/0446* (2013.01); *H04W 72/0466* (2013.01); *H04W 72/1263* (2013.01); *H04W 72/1278* (2013.01); *H04W 72/14* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC .. H04L 5/003–0098; H04W 8/22–245; H04W 28/04–065; H04W 48/02–16; H04W 72/005–14; H04W 74/002–008; H04W 84/02; H04W 84/04–045; H04W 88/02; H04W 88/04–12; H04W 92/02; H04W 92/04; H04W 92/10
See application file for complete search history.

(56) References Cited

U.S. PATENT DOCUMENTS

| | | | |
|---|---|---|---|
| 2015/0280876 A1 | 10/2015 | You et al. | |
| 2017/0099123 A1 | 4/2017 | Yamada et al. | |
| 2017/0208583 A1* | 7/2017 | Jiang | H04L 5/0055 |
| 2017/0288819 A1* | 10/2017 | Chen | H04W 72/0466 |

FOREIGN PATENT DOCUMENTS

| | | | | |
|---|---|---|---|---|
| WO | 2015/190313 A1 | 12/2015 | | |
| WO | WO-2017123275 A1 * | 7/2017 | | H04L 1/1812 |

OTHER PUBLICATIONS

LG Electronics et al.; "Summary of email discussion [84-10] on UCI for NB-IoT"; 3GPP TSG RAN WG1 NB-IoT Ad-Hoc Meeting, R1-161972; Sophia Antipolis, France, Mar. 22-24, 2016 (7 Pages).
Ericsson; "Scheduling and HARQ principles for NB-IoT"; 3GPP TSG-RAN WG2 Meeting NB-IOT ad-hoc, R2-160427; Budapest, Hungary, Jan. 19-21, 2016 (7 Pages).
International Search Reporting issued in PCT/JP2017/009227 dated May 30, 2017 (5 Pages).
Written Opinion of the International Searching Authority issued in PCT/JP2017/009227 dated May 30, 2017 (12 Pages).
Huawei, HiSilicon; "Short TTI for DL transmissions"; 3GPP TSG RAN WG1 Meeting #84, R1-160292; St Julian's, Malta, Feb. 15-19, 2016 (7 Pages).
Huawei, HiSilicon; "Short TTI for UL transmissions"; 3GPP TSG RAN WGI Meeting #84, R1-160294; St Julian's, Malta, Feb. 15-19, 2016 (4 Pages).
NTT DOCOMO, Inc.; "5G Radio Access: Requirements, Concept and Technologies"; DOCOMO 5G White Paper; Sep. 2014(27 Pages).
Office Action issued in the counterpart Korean Patent Application No. 10-2018-7028339, dated Sep. 17, 2021 (8 pages).
Office Action in counterpart Japanese Patent Application No. 2018-508892 dated Dec. 7, 2021 (7 pages).
Office Action in counterpart Chinese Patent Application No. 201780020721.0 dated Jan. 30, 2022 (10 pages).
Office Action in counterpart Japanese Patent Application No. 2018-508892 dated Oct. 4, 2022 (10 pages).
Ericsson; "5G—Key Component of the Networked Society"; 3GPP RAN Workshop on 5G, RWS-150009; Phoenix, AZ, USA, Sep. 17-18, 2015 (55 Pages).

* cited by examiner

FIG.8

| PARAMETER NAME | CONTENT |
|---|---|
| SYMBOL MAPPING OF DOWNLINK DATA CHANNEL | BITMAP FOR SYMBOL INDEX<br>0 0 0 1 1 1 1 1 1 1 0 0 0 0 →Symbol index(0~13) |
| SYMBOL MAPPING OF UPLINK DATA CHANNEL | BITMAP FOR SYMBOL INDEX<br>0 0 0 0 0 0 0 0 0 0 0 0 0 0 →Symbol index(0~13) |

FIG.12

| PARAMETER NAME | CONTENT |
|---|---|
| SYMBOL MAPPING OF DOWNLINK DATA CHANNEL | BITMAP FOR SYMBOL INDEX<br>0,0,0,1,1,1,1,1,1,1,0,0,0,0 → Symbol index(0~13) |
| SYMBOL MAPPING OF UPLINK DATA CHANNEL | BITMAP FOR SYMBOL INDEX<br>0,0,0,0,0,0,0,0,0,0,0,0,0,0 → Symbol index(0~13) |
| Seg#1 END SYMBOL | Seg#1 END SYMBOL INDEX |
| Seg#2 END SYMBOL | Seg#2 END SYMBOL INDEX |

USER EQUIPMENT AND COMMUNICATION METHOD

TECHNICAL FIELD

The present invention relates to a user equipment and a communication method.

BACKGROUND ART

In recent years, in 3rd Generation Partnership Project (3GPP), a fifth-generation wireless technology has been examined in order to further increase system capacity and a data transmission rate, to further reduce a delay in a wireless section, to achieve the simultaneous connection of a large number of terminals, to reduce the costs of a terminal, and reduce power consumption.

As an example of an element technique in the fifth-generation wireless technology, a technique called massive MIMO in which a large number of antenna elements (for example, 100 elements) are provided in a base station and a beam with a narrow beam width is formed, in order to effectively use a high frequency, has been examined. In addition, a technique called non-orthogonal multiple access (NOMA) in which multiplexing is performed in a power direction has been examined in order to further improve frequency utilization efficiency. Furthermore, a technique that uses a new signal waveform different from a signal waveform used in LTE while allowing incompatibility with LTE has been examined.

CITATION LIST

Non-Patent Document

Non-Patent Document 1: "DOCOMO 5G White Paper", September 2014, NTT DOCOMO, Internet URL:https://www.nttdocomo.co.jp/corporate/technology/whitepaper_5g/

SUMMARY OF THE INVENTION

Problem to be Solved by the Invention

In order to further reduce a delay in the fifth-generation wireless technology, a radio frame which is called a self-contained subframe and has a radio frame structure with a higher flexibility than that in the LTE system according to the related art has been examined.

FIG. 1 is a diagram illustrating an example of the self-contained subframe. The use of the self-contained subframe makes it possible to dynamically change the purpose of the subframe (downlink (DL)) or uplink (UL)) and to feed back ACK/NACK for DL data in one subframe. FIG. 1(a) illustrates a case in which the purpose of the subframe is changed to a DL data channel and FIG. 1(b) illustrates a case in which the purpose of the subframe is changed to a UL data channel.

It is necessary to perform a DL/UL data receiving process (demodulation and decoding) at a high speed in order to further reduce a delay in communication. Therefore, it is considered that the number of symbols in a DL/UL data channel is reduced. In the 5G wireless technology, there is a terminal that does not require a very low delay, but requires high-capacity data communication. Therefore, it is not preferable to uniformly reduce the number of symbols in the DL/UL data channel in all terminals.

For this reason, for example, a method is considered which uses a self-contained subframe, without any change, and allows the same carrier (cell) to have different subframe structures while reducing the number of symbols per subframe, as illustrated in FIG. 2. However, when this subframe structure is allowed, interference is likely to occur due to frequency multiplexing between DL communication and UL communication, which is not preferable.

The disclosed technique has been made in view of the above-mentioned problems and an object of the disclosed technique is to provide a technique that can appropriately achieve low-delay communication when a radio frame structure in which DL and UL can be flexibly switched is used.

Means for Solving Problem

A user equipment according to the disclosed technique is provided in a wireless communication system including a base station and the user equipment and includes an acquisition unit that acquires information indicating a resource position where a downlink data channel is mapped or a resource position where an uplink data channel is mapped in a radio frame and a timing when an HARQ response to downlink data is transmitted from the user equipment or a timing when an HARQ response to uplink data is received from the base station and a communication unit that transmits an HARQ response to downlink data received by the downlink data channel at the timing when the HARQ response to the downlink data is transmitted and receives an HARQ response to data transmitted by the uplink data channel or retransmission data scheduling information at the timing when the HARQ response to the uplink data is received.

Effect of the Invention

According to the disclosed technique, it is possible to provide a technique that can appropriately achieve low-delay communication when a radio frame structure in which DL and UL can be flexibly switched is used.

BRIEF DESCRIPTION OF DRAWINGS

FIG. 8 is a diagram illustrating an example of radio frame configuration information represented in a bitmap format;

FIG. 12 is a diagram illustrating an example of radio frame configuration information including the range of a segment;

MODE(S) FOR CARRYING OUT THE INVENTION

Hereinafter, an embodiment of the invention will be described with reference to the drawings. The following embodiment is illustrative and the embodiment to which the invention is applied is not limited to the following embodiment. For example, it is assumed that a wireless communication system according to this embodiment is a system based on LTE or 5G. However, the invention is not limited to LTE or 5G and can be applied to other communication systems. In the specification and the claims, "LTE" includes a fifth-generation communication system corresponding to 3GPP Release 10, 11, 12, 13, 14, or beyond, in addition to a communication system corresponding to 3GPP Release 8 or 9, unless otherwise noted.

In the following description, one TTI means the minimum unit of scheduling. In addition, it is assumed that one subframe has the same length as one TTI. However, the invention is not limited thereto. One subframe may be substituted with other units.

<System Structure>

Figure 1:
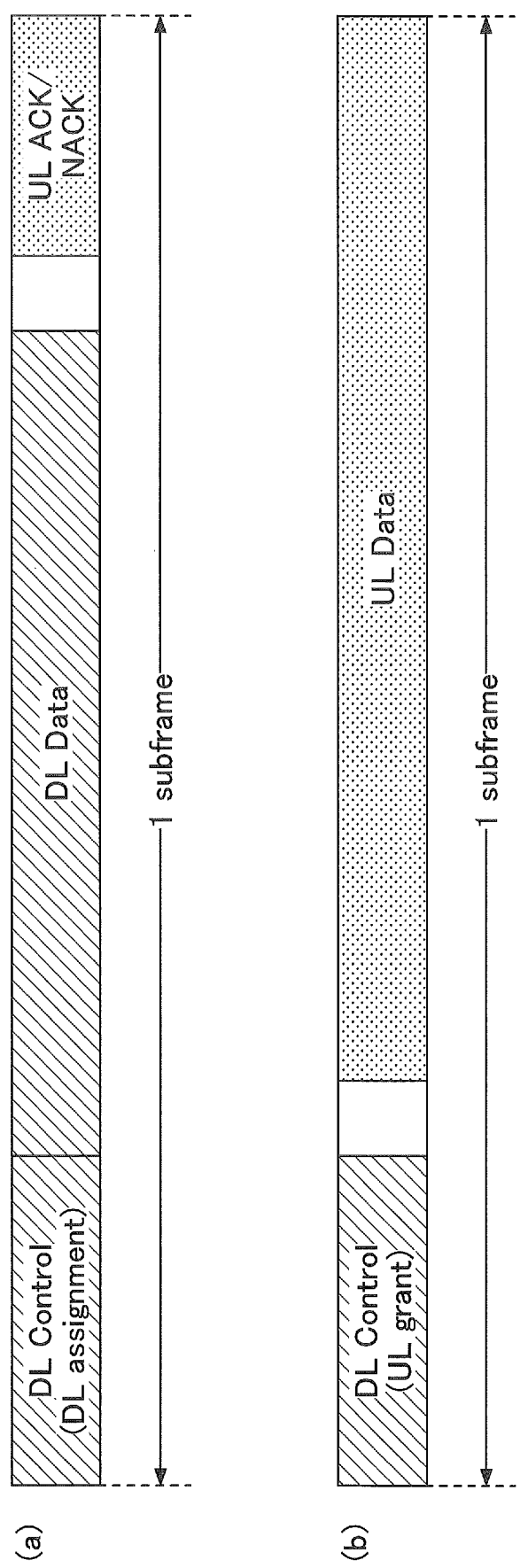
FIG. 1 is a diagram illustrating an example of a self-contained subframe.
Figure 2:
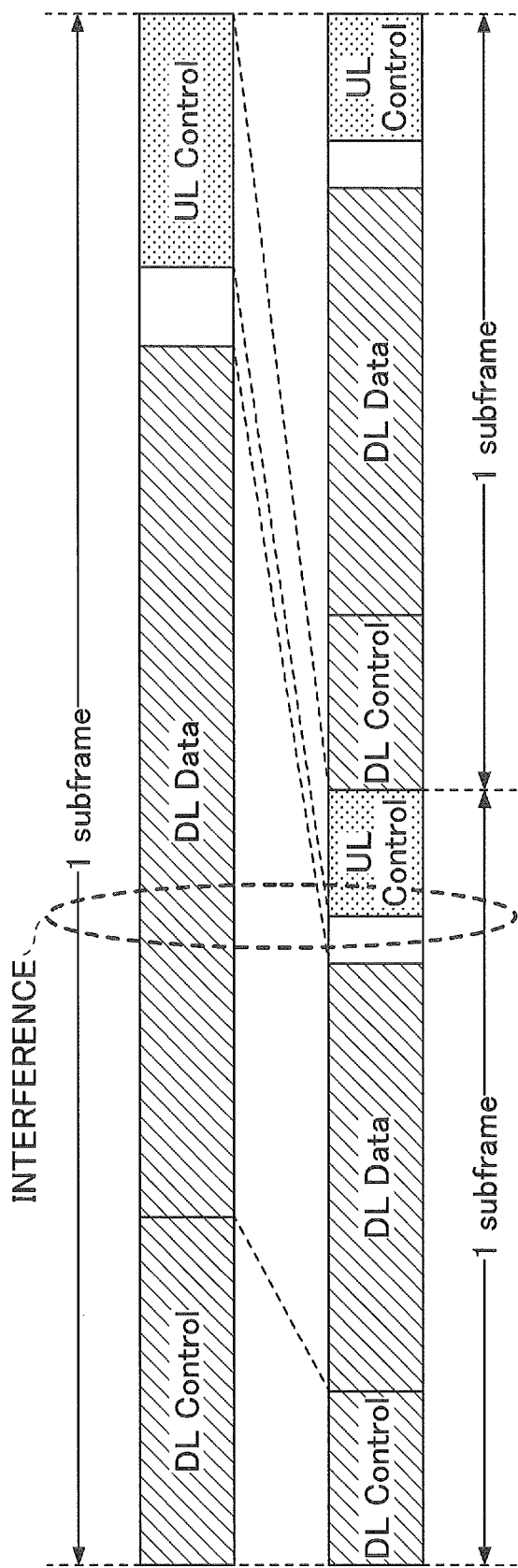
FIG. 2 is a diagram illustrating a problem.
Figure 3:
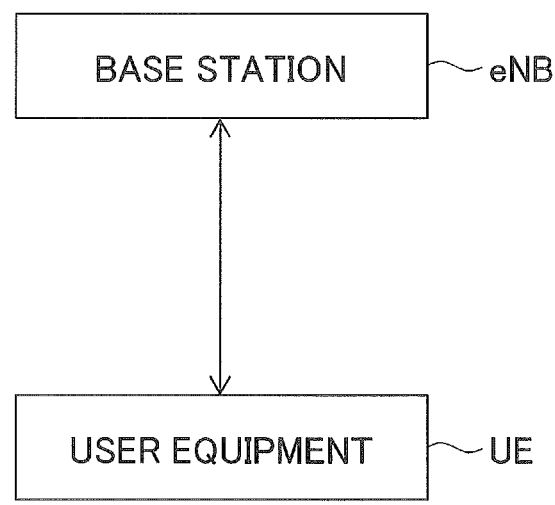
FIG. 3 is a diagram illustrating an example of the structure of a wireless communication system according to an embodiment.

FIG. 3 is a diagram illustrating an example of the structure of a wireless communication system according to an embodiment. As illustrated in FIG. 3, the wireless communication system according to this embodiment includes a base station eNB and a user equipment UE. In the example illustrated in FIG. 3, one base station eNB and one user equipment UE are illustrated. However, the wireless communication system may include a plurality of base stations eNB or a plurality of user equipments UE.

<Procedure>

(For Structure of Radio Frame)

Next, the structure of a radio frame used when the base station eNB and the user equipment UE communicate with each other in this embodiment will be described. According to the radio frame of this embodiment, it is possible to configure the resource position of a downlink data channel (DL Data CH) or/and the resource position of an uplink data channel (UL Data CH) in one subframe, using a message in a downlink control channel (DL CCH) or a higher layer (broadcast information or RRC). In addition, it is possible to configure the feedback timing of ACK/NACK in a downlink hybrid automatic repeat request (HARQ) or/and uplink HARQ feedback timing (including the timing when uplink retransmission scheduling information is transmitted), using a message in a downlink control channel (DL CCH) or a higher layer (broadcast information or RRC).

Figure 4:
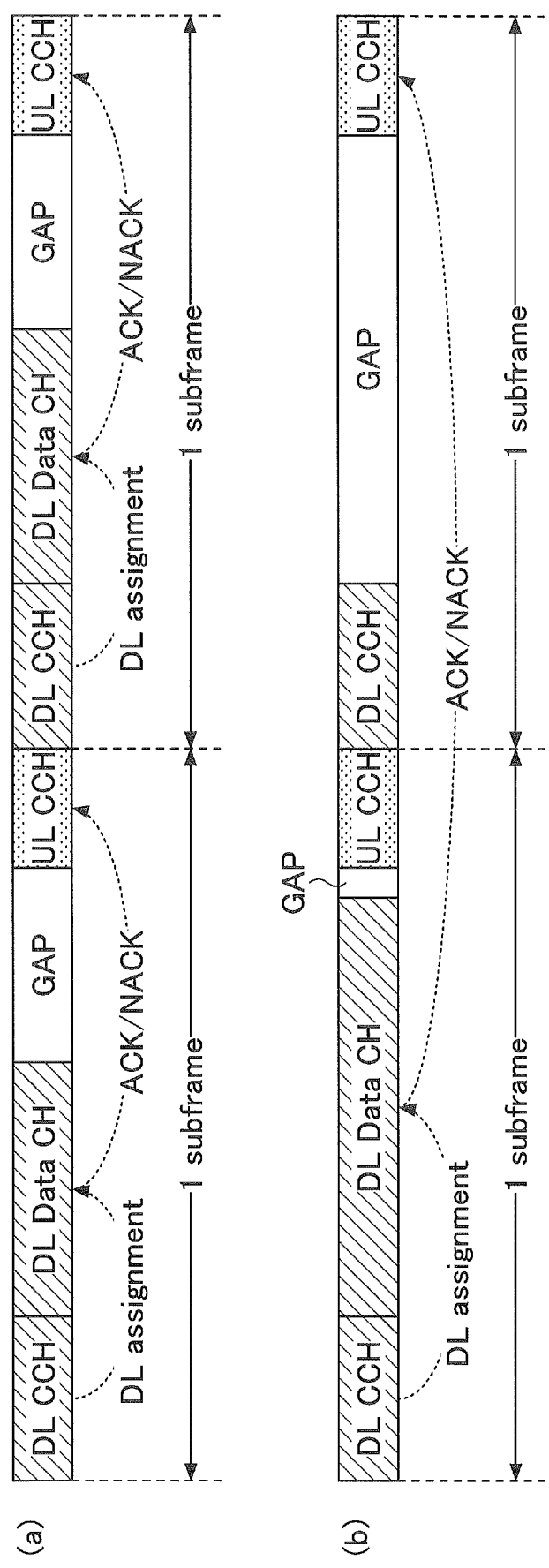
FIG. 4 is a diagram illustrating an example of a subframe structure (DL data) and feedback timing.

FIG. 4 is a diagram illustrating an example of the structure of a subframe (DL data) and the feedback timing. In the subframes illustrated in FIG. 4, one subframe includes a downlink control channel, a downlink data channel, and an uplink control channel (UL CCH). The subframe structure illustrated in FIG. 4(a) is configured such that the number of symbols assigned to the downlink data channel is reduced and ACK/NACK for data transmitted by the downlink data channel is fed back by the uplink control channel in the same subframe. The subframe structure illustrated in FIG. 4(b) is configured such that the number of symbols assigned to the downlink data channel increases and ACK/NACK for data transmitted by the downlink data channel is fed back by an uplink control channel in the next subframe.

The subframe structure illustrated in FIG. 4(a) has the advantage that the maximum TB size that can be mapped to the downlink data channel is small since the number of symbols configured in the downlink data channel is small and a delay is short since ACK/NACK is fed back in the same subframe. In contrast, the subframe structure illustrated in FIG. 4(b) has the advantage that, since the number of symbols configured in the downlink data channel is large, the amount of delay increases a little, but the maximum TB size that can be mapped to the downlink data channel is large.

Figure 5:
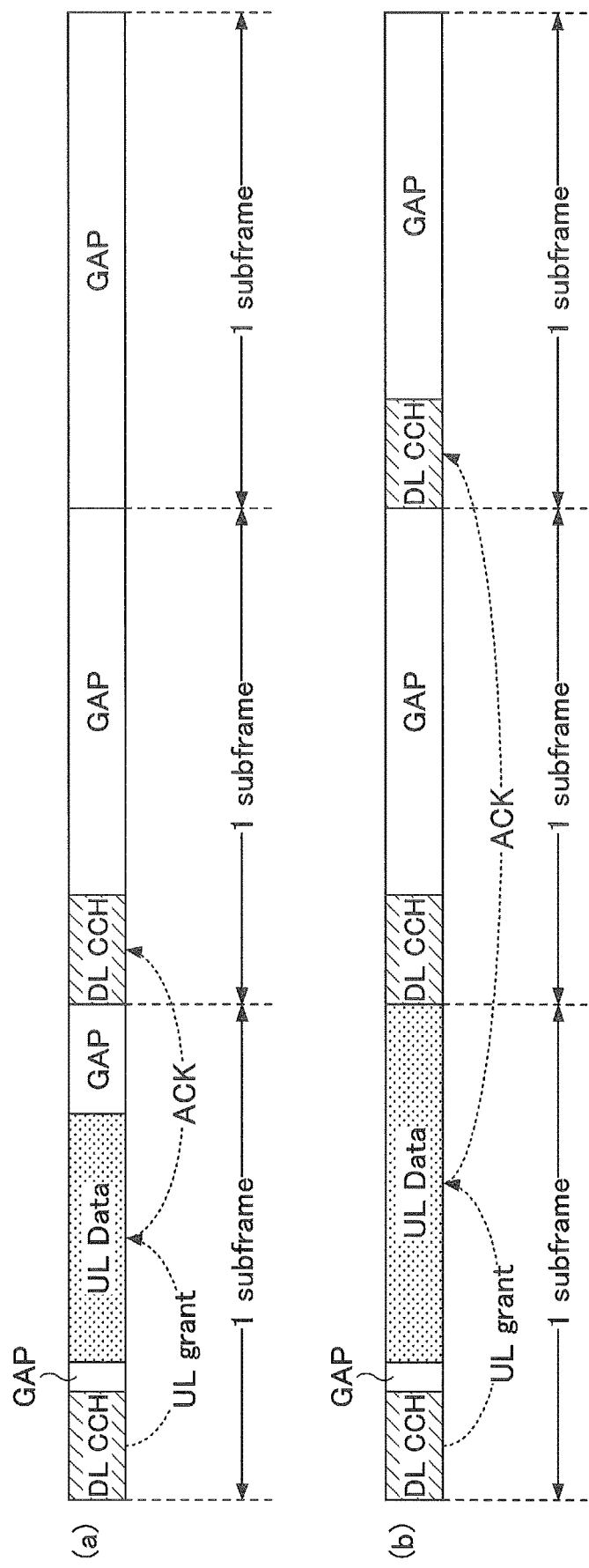
FIG. 5 is a diagram illustrating an example of a subframe structure (UL data) and feedback timing.
Figure 6:
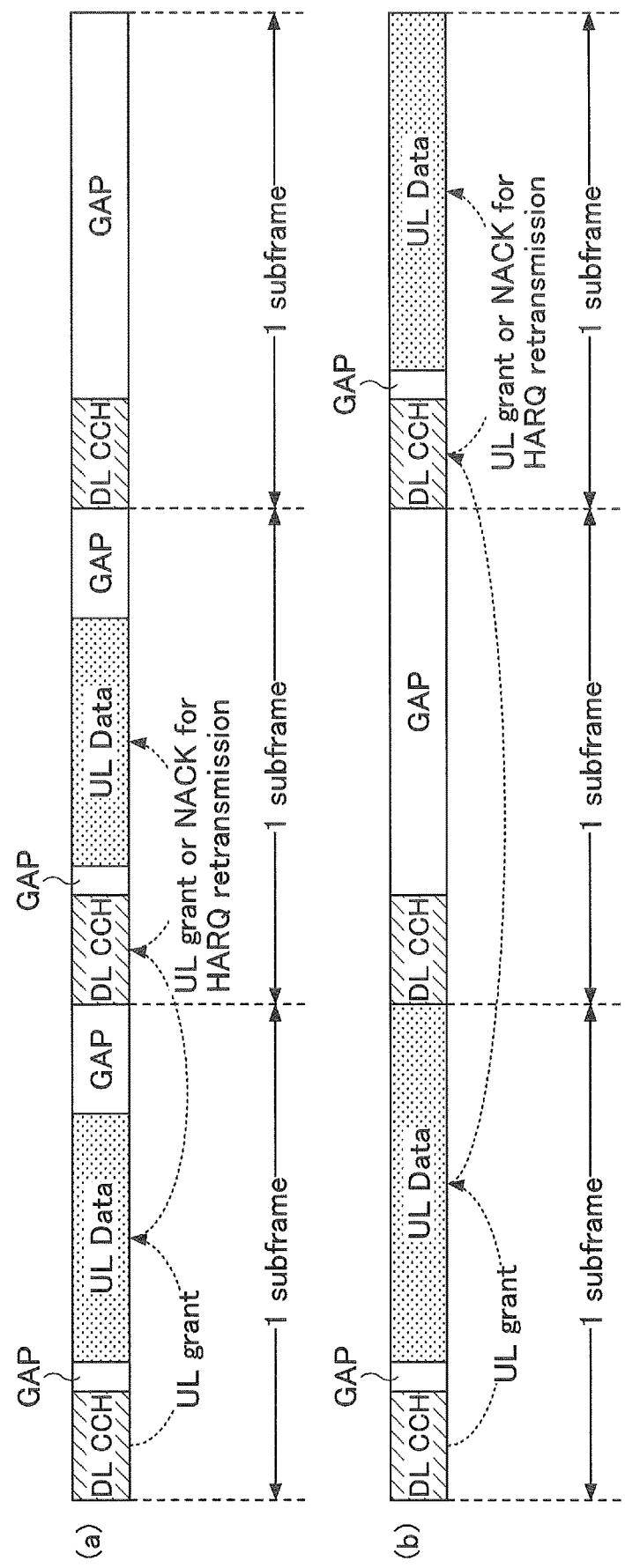
FIG. 6 is a diagram illustrating an example of a subframe structure (UL data) and feedback timing.

FIGS. 5 and 6 are diagrams illustrating an example of the subframe structure (UL data) and the feedback timing. In the subframes illustrated in FIGS. 5 and 6, one subframe includes a downlink control channel, an uplink data channel, and an uplink control channel. The subframe structures illustrated in FIG. 5(a) and FIG. 6(a) are configured such that the number of symbols assigned to the uplink data channel is small and ACK/NACK for data transmitted by the uplink data channel is fed back by a downlink control channel in the next subframe. The subframe structures illustrated in FIG. 5(b) and FIG. 6(b) are configured such that the number of symbols assigned to the uplink data channel is large and ACK/NACK for data transmitted by the uplink data channel is fed back by a downlink control channel in the frame after the next frame. In FIGS. 6(a) and 6(b), UL grant is transmitted when the retransmission of uplink data accompanied by the scheduling of radio resources is performed (that is, which corresponds to adaptive retransmission in LTE). In addition, in FIGS. 6(a) and 6(b), NACK is transmitted when the retransmission of uplink data that is not accompanied by new scheduling is performed (that is, which corresponds to non adaptive retransmission in LTE).

The subframe structures illustrated in FIG. 5(a) and FIG. 6(a) have the following advantages: since the number of symbols configured in the uplink data channel is small, the maximum TB size that can be mapped to the uplink data channel is small; and since ACK/NACK is fed back in the next subframe and retransmission data is transmitted, a delay is short. The subframe structures illustrated in FIG. 5(b) and FIG. 6(b) have the advantage that, since the number of symbols configured in the uplink data channel is large, the amount of delay increases a little, but the maximum TB size that can be mapped to the uplink data channel is large.

The structure of the radio frame used when the base station eNB and the user equipment UE communicate with each other in this embodiment has been described above. The channel structure in the subframe illustrated in FIGS. 4 to 6 is just an example and the invention is not limited thereto. For example, this embodiment may include a radio frame in which another physical channel or predetermined header information is configured at the head of a subframe and a downlink control channel is configured behind the head. In addition, for example, the invention may include a radio frame in which an uplink control channel is configured between a downlink control channel and an uplink (or downlink) data channel.

(For Configuration of Subframe Structure and Feedback Timing)

Figure 7:
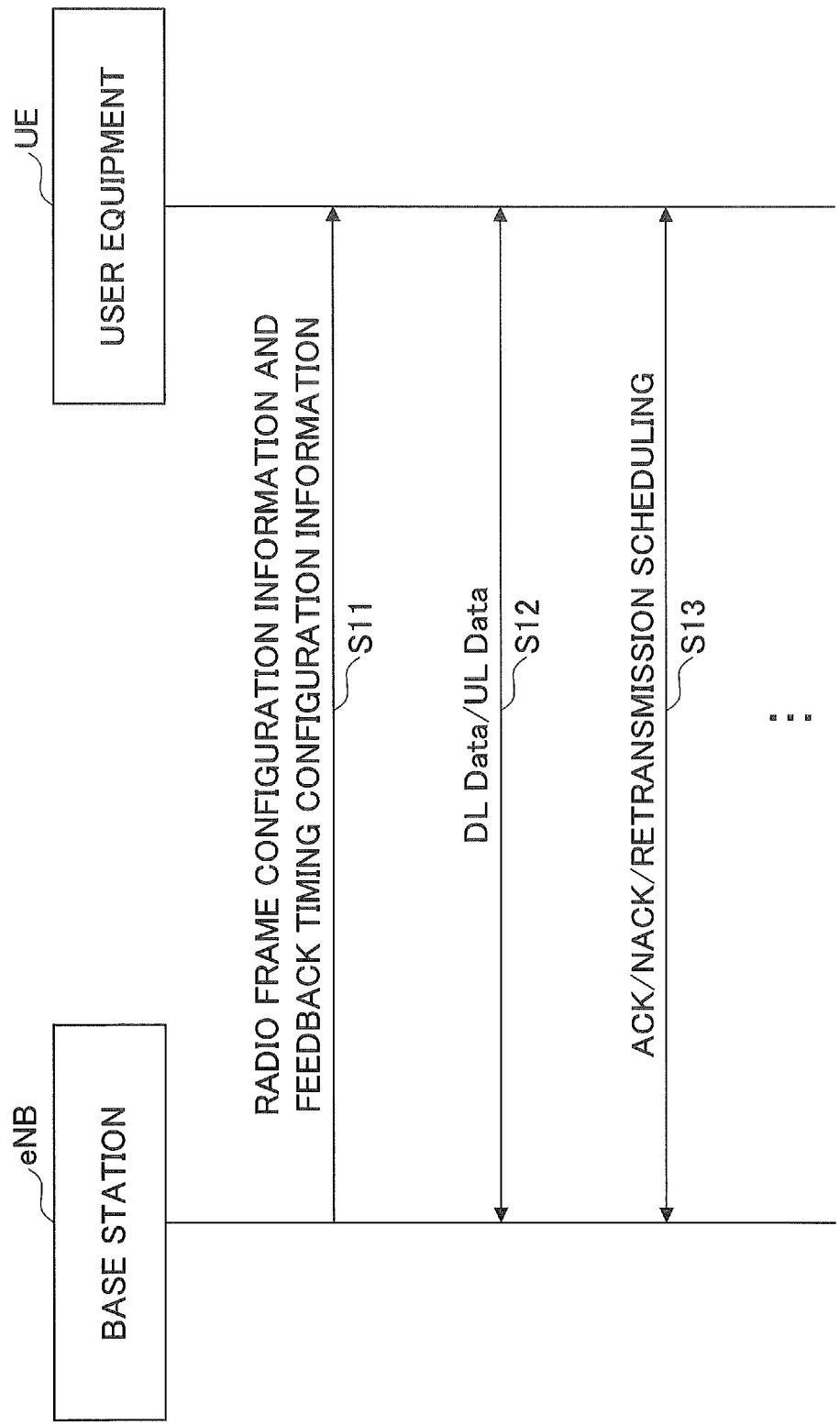
FIG. 7 is a sequence diagram illustrating an example of a procedure when, for example, a subframe structure and feedback timing are configured in a user equipment.

FIG. 7 is a sequence diagram illustrating an example of a procedure when, for example, the subframe structure and the feedback timing are configured in the user equipment.

In Step S11, the base station eNB configures information indicating the resource position (symbol mapping) of the downlink data channel or/and the uplink data channel in the subframe and the downlink HARQ feedback timing or/and the uplink HARQ feedback timing (including the timing when uplink retransmission scheduling information is transmitted) in the user equipment UE.

Hereinafter, the information indicating the resource position (symbol mapping) of the downlink data channel or/and the uplink data channel in the subframe is referred to as "radio frame configuration information" for convenience. The Information indicating the downlink HARQ feedback timing or/and the uplink HARQ feedback timing (including the timing when uplink retransmission scheduling information is transmitted) is referred to as "feedback timing configuration information" for convenience.

The base station eNB may configure the radio frame configuration information and the feedback timing configuration information in the user equipments UE in a cell, using broadcast information (SIB), or may configure the radio frame configuration information and the feedback timing configuration information in the individual user equipment UE, using an RRC message. In addition, the base station eNB may transmit downlink control information (DCI) including the radio frame configuration information and the feedback timing configuration information, using a common search space of the downlink control channel, to configure common radio frame configuration information and common feedback timing configuration information in the user equipments UE in the cell, or may transmit the downlink control information, using an individual search space of the downlink control channel, to configure the radio frame configuration information and the feedback timing configuration information in the individual user equipment UE. When the radio frame configuration information and the feedback timing configuration information are configured in the user equipment UE, using the downlink control information, the base station eNB can dynamically change the subframe structure and the HARQ feedback timing for each subframe.

In Step S12, the user equipment UE receives downlink data or/and transmits uplink data according to the resource position of the downlink data channel or/and the uplink data channel configured in the subframe.

In Step S13, the user equipment UE transmits ACK or NACK for the downlink data to the base station eNB according to the configured HARQ feedback timing. In addition, the user equipment UE receives ACK or NACK (NACK or retransmission scheduling information) for the uplink data, according to the configured HARQ feedback timing (including the timing when retransmission scheduling is performed).

In this embodiment, when the radio frame configuration information and the feedback timing configuration information are configured in the individual user equipment UE by the RRC message in Step S11 and the RRC message is Message4 (or a message corresponding to Message4) in the random access procedure, default radio frame configuration information and default feedback timing configuration information may be fixedly defined (stored in the user equipment UE in advance) by, for example, the standard specification, may be preconfigured in the user equipment UE, or may be indicated by broadcast information. In this case, it is possible to avoid the problem that the user equipment UE is not capable of recognizing the subframe structure and the HARQ feedback timing until Message4 is received.

In the radio frame configuration information, the resource position of the downlink data channel or/and the uplink data channel may be designated by the position of a start symbol and the position of an end symbol in the downlink data channel or/and the uplink data channel. For example, the radio frame configuration information may be represented in a bitmap format, as illustrated in FIG. 8. In addition, the position of the start symbol in the downlink data channel or/and the uplink data channel may be fixed in advance or only the position of the end symbol may be included in the radio frame configuration information. A plurality of patterns indicating the position of the start symbol and the position of the end symbol in the downlink data channel or/and the uplink data channel may be defined in advance by, for example, the standard specification, and only an index value indicating the pattern to be applied among the plurality of patterns which have been defined in advance may be configured in the radio frame configuration information. In Step S11, when the radio frame configuration information is included in the downlink control information, the index value is not explicitly designated, but may be implicitly designated by RNTI (for example, RNTI used in a common search space) or a DCI format (for example, a DCI format used in the common search space).

The feedback timing configuration information may further include the timing (or a timing candidate) when downlink scheduling information (DL assignment) is transmitted during the retransmission of downlink data. In this case, when scheduling information related to the retransmission of downlink data is not received from the base station eNB until the timing, the user equipment UE determines that retransmission has timed out and can delete a buffer (a buffer for an HARQ process corresponding to the downlink data). In addition, the user equipment UE can use the deleted buffer for other purposes (for example, the reception of a D2D signal). In the LTE system according to the related art, the timing is called an HARQ round trip time (RTT) timer. The timer is defined to be 8 ms or more for downlink retransmission data.

[For Pattern of HARQ Feedback Timing]

Here, the maximum TB size that can be mapped to the downlink data channel or the uplink data channel varies depending on the number of symbols in the downlink data channel or the uplink data channel. It is assumed that the time required to demodulate and decode downlink data varies depending on the processing capability of the user equipment UE even when the number of symbols is the same.

In this embodiment, the base station eNB may insert a plurality of patterns of the downlink HARQ feedback timing or/and the uplink HARQ feedback timing (including the timing when uplink retransmission scheduling information is transmitted) which correspond to the processing capability of the user equipment UE into the feedback timing configuration information. In addition, the user equipment UE may select a pattern corresponding to the processing capability of the user equipment UE from the plurality of patterns and may feed back ACK/NACK for the downlink data according to the selected pattern. The user equipment UE may select a pattern corresponding to the processing capability of the user equipment UE from the plurality of patterns and may receive ACK/NACK (or scheduling information related to retransmission) for the uplink data according to the selected pattern. The user equipment UE may transmit to the base station eNB capability information (UE capability) indicating the processing capability of the user equipment UE in advance and the base station eNB may determine a plurality of patterns to be inserted into the feedback timing configuration information in the processing capability range of each of a plurality of user equipments UE in a cell.

As another example, the user equipment UE may transmit to the base station eNB the processing capability of the user equipment UE in advance and the base station eNB may insert only the pattern, which can correspond to the user equipment UE with the lowest processing capability among the processing capabilities of a plurality of user equipments UE in a cell, into the feedback timing configuration information and may configure the common feedback timing configuration information in each of the user equipments UE in the cell. In this case, since the ACK/NACK feedback timing is the same between the user equipments UE, it is possible to improve the utilization efficiency of the radio resources. In addition, it is possible to prevent the process of the base station eNB from being complicated due to the difference in ACK/NACK feedback timing between the user equipments UE.

(For Division of Downlink Data Channel or Uplink Data Channel)

In the above-mentioned subframe structure, the number of symbols in the downlink data channel is variable. However, in this embodiment, the downlink data channel or the uplink data channel may be divided into a plurality of segments in a time direction and different TBs may be mapped to the segments.

Figure 9:
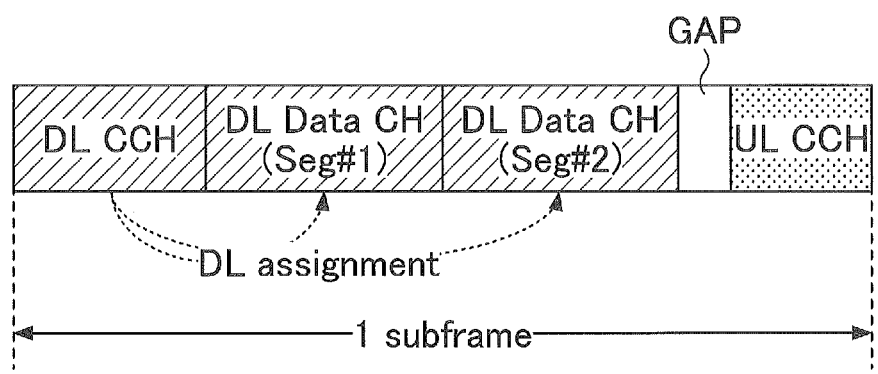
FIG. 9 is a diagram illustrating an example of a downlink data channel divided into a plurality of segments.

FIG. 9 is a diagram illustrating an example of the downlink data channel divided into a plurality of segments. In FIG. 9, the downlink data channel is divided into two segments (Seg #1 and Seg #2) and the segment to which TB is mapped and a resource position are designated by downlink scheduling information (DL assignment).

The division of the downlink data channel or the uplink data channel into a plurality of segments in the time direction makes it possible to reduce the maximum size of TB that can be transmitted. Therefore, the user equipment UE and the base station eNB can reduce the time required to demodulate and decode data per TB. In addition, for the segment close to the first half of the subframe, the user equipment UE and the base station eNB can start demodulating and decoding the subframe at the time when the reception of the segment has completed. Therefore, it is possible to achieve low-delay communication.

[Example of Resource Assignment]

Figure 10:
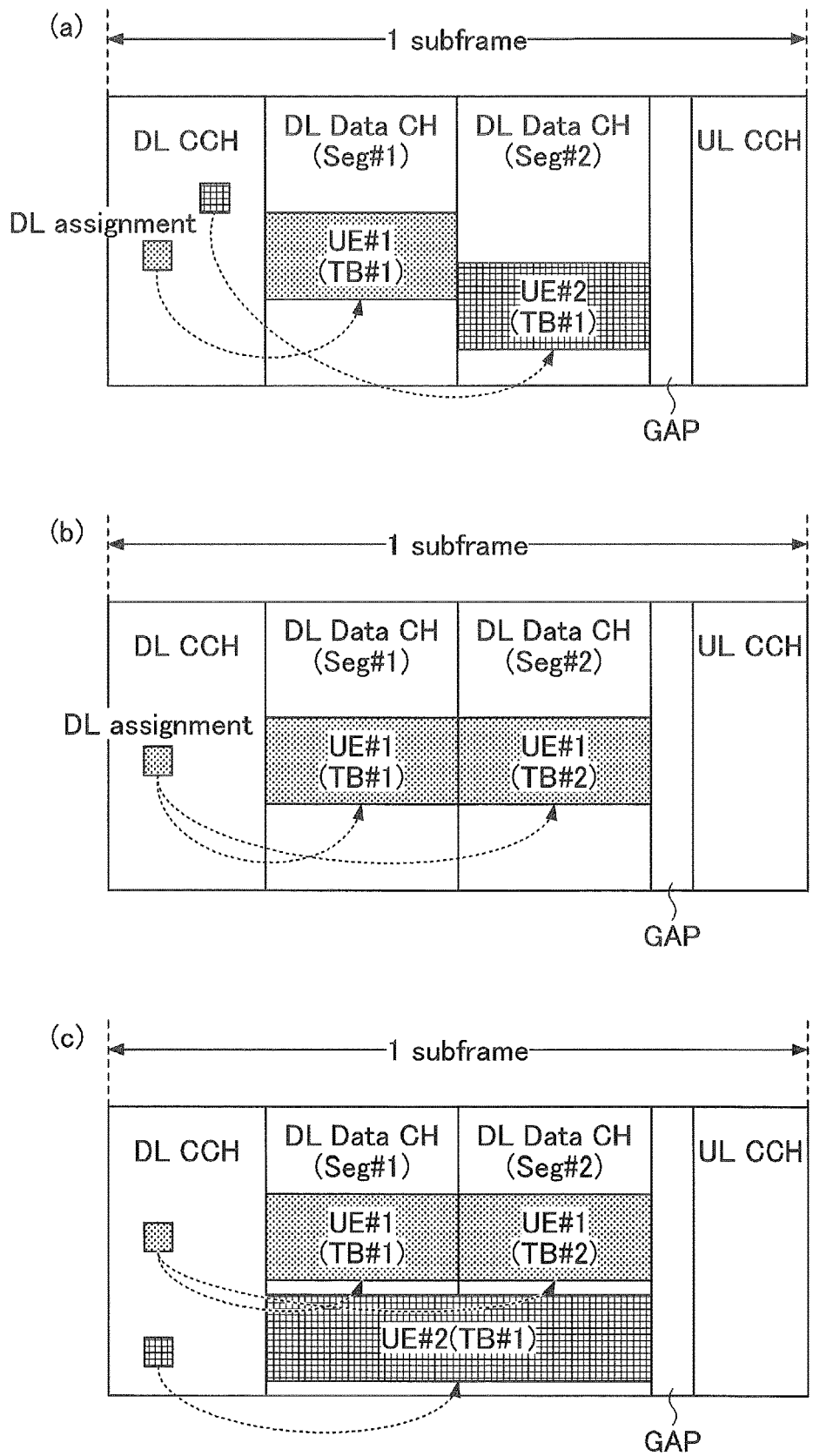
FIG. 10 is a diagram illustrating an example in which resources are assigned to a plurality of segments.
Figure 11:
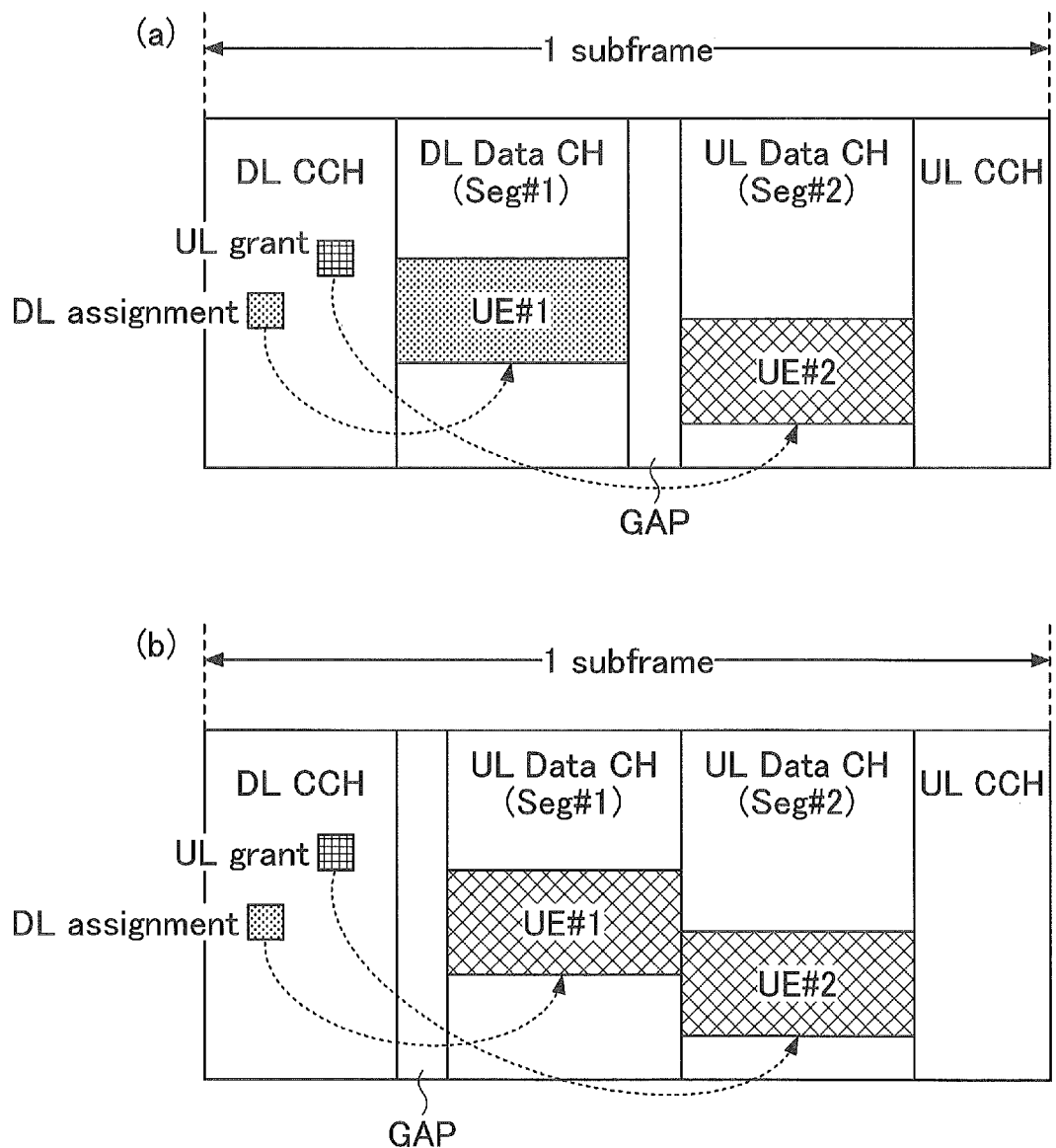
FIG. 11 is a diagram illustrating an example in which resources are assigned to a plurality of segments.

Next, an example of resource assignment when the downlink data channel or the uplink data channel is divided into a plurality of segments in the time direction will be described in detail with reference to FIGS. 10 and 11. In FIGS. 10 and 11, the vertical direction indicates an arbitrary bandwidth.

FIG. 10(a) illustrates an example in which resources for different user equipments UE (UE #1 and UE #2) are assigned to each segment. In the case illustrated in FIG. 10(a), downlink scheduling information needs to be transmitted to each of the user equipments UE (UE #1 and UE #2). For example, a process of assigning downlink data to the first segment can be performed for the user equipment UE (UE #1) requiring low-delay communication.

FIG. 10(b) illustrates an example in which resources for the user equipment are assigned to a plurality of segments. I the case illustrated in FIG. 10(b), resources can be assigned to a plurality of segments by one downlink scheduling information item. The user equipment UE can demodulate and decode TB #1 which has been received first while receiving the next TB #2. Therefore, low-delay communication is achieved.

FIG. 10(c) illustrates an example in which resource assignment is performed for the user equipment UE #1 by the same method as that illustrated in FIG. 10(b) and resource assignment is performed across the segments for the user equipment UE #2.

FIG. 11(a) illustrates an example in which the segment (Seg #1) and the segment (Seg #2) are configured in the downlink data channel and the uplink data channel, respectively, resources for the user equipment UE #1 are assigned to the segment (Seg #1), and resources for the user equipment UE #2 are assigned to the segment (Seg #2).

FIG. 11(b) illustrates an example in which the segment (Seg #1) and the segment (Seg #2) are configured in the uplink data channel, resources for the user equipment UE #1 are assigned to the segment (Seg #1), and resources for the user equipment UE #2 are assigned to the segment (Seg #2).

In the above-mentioned examples of the resource assignment, there are two segments. However, this embodiment is not limited thereto and the data channel may be divided into three or more segments.

[Notification of Segment Structure]

When the downlink data channel or the uplink data channel is divided into a plurality of segments, information indicating the range of each segment may be included in the radio frame configuration information.

FIG. 12 illustrates an example of the radio frame configuration information including the range of each segment. As illustrated in FIG. 12, the radio frame configuration information may include a bitmap indicating the mapping of symbols to the downlink data channel or the uplink data channel and a symbol index indicating the position of an end symbol in each segment.

In addition, a plurality of patterns indicating the position of the start symbol and the position of the end symbol in the downlink data channel or the uplink data channel and the division position of the segments in the downlink data channel or the uplink data channel may be defined in advance by, for example, the standard specification and only an index value indicating the pattern to be applied among the plurality of patterns which have been defined in advance may be configured in the radio frame configuration information. In Step S11 of FIG. 7, when the radio frame configuration information is included in the downlink control information, the index value is not explicitly designated, but may be implicitly designated by RNTI (for example, RNTI used in a common search space) or a DCI format (for example, a DCI format used in the common search space).

As a modification example, in the information indicating the range of each segment illustrated in FIG. 12, when the symbol indexes indicating the position of the end symbol in each segment have the same value, this may mean that segment division has not been performed. For example, in the example illustrated in FIG. 12, when the end symbol indexes of the segment (Seg1) and the segment (Seg2) are configured to "9", this may mean that segment division has not been performed.

[For Coding and Scrambling Process]

Figure 13:
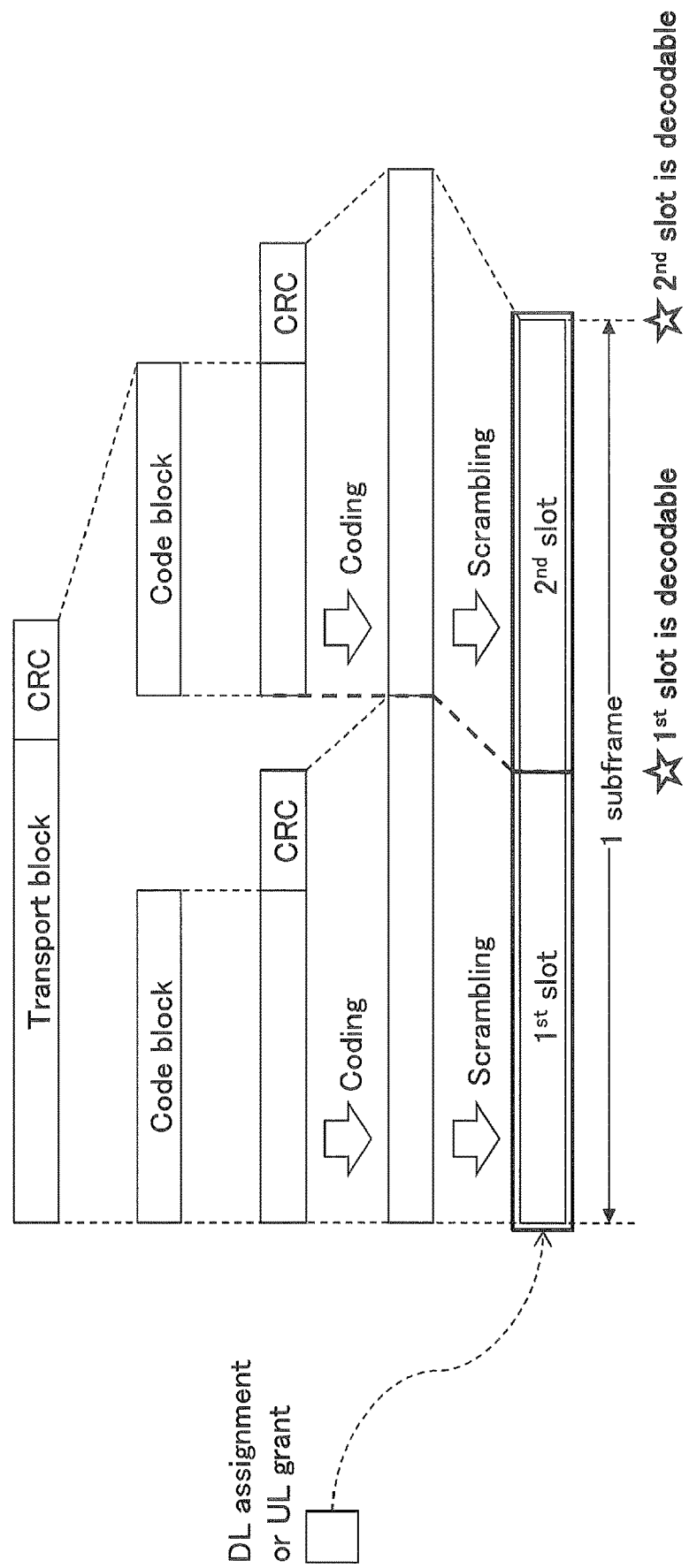
FIG. 13 is a diagram illustrating a coding and scrambling method.

In the above-mentioned structure, it is assumed that TB is mapped to each segment. However, in this embodiment, one TB may be mapped to a plurality of segments. In this case, as illustrated in FIG. 13, the base station eNB or the user equipment UE may divide one TB into a plurality of code blocks corresponding to the number of segments, perform coding and scrambling for each code block, and map the scrambled data to the resources assigned to each segment. The user equipment UE or the base station eNB may perform signal decoding for each segment.

(For Transmission and Use of Reference Signal)

When performing a downlink data demodulation process, preferably, the user equipment UE performs channel estimation, using a reference signal in the resources to which at least the downlink data is mapped, and performs a demodulation process, using the result of the channel estimation. Here, in this embodiment, the number of symbols and the number of segments used in the downlink data channel can be configured to various values. It is also assumed that the downlink data is mapped only to some symbols (that is, the downlink data is not mapped to some of the symbols), according to the content of configuration and scheduling.

In this embodiment, the base station eNB may transmit the reference signal, using the symbol to which no downlink data has been mapped, and the user equipment UE may perform channel estimation, using both the reference signal transmitted by the symbol in the resources of the downlink data which have been assigned to the user equipment UE and the reference signal transmitted by the symbol in the resources which have not been assigned to the user equipment UE, and perform the demodulation process.

Figure 14:
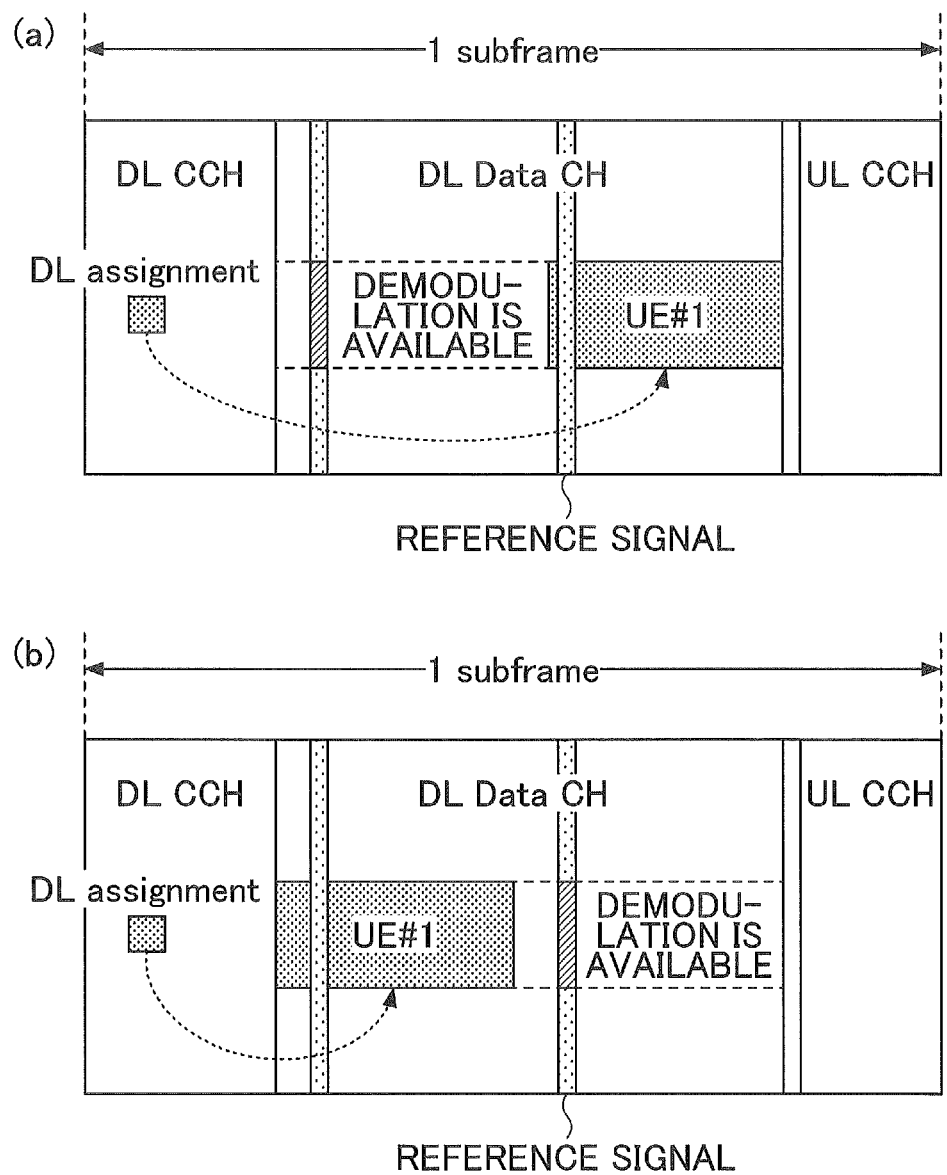
FIG. 14 is a diagram illustrating a method of using a reference signal.

This will be described in detail with reference to FIG. 14. In the example illustrated in FIG. 14, it is assumed that the reference signal is mapped to the symbol in the first half and the second half of the downlink data channel. The mapping position of the reference signal is illustrative. For example, the reference signal may be mapped to a plurality of resource elements in the downlink data channel as in LTE.

For example, as illustrated in FIG. 14(a), when downlink data for the user equipment UE is mapped to the symbol in the second half of the downlink data channel, the user equipment UE may perform the demodulation process, using both the reference signal transmitted by the symbol in the second half of the downlink data channel and the reference signal transmitted by the symbol in the first half. As illustrated in FIG. 14(b), when downlink data for the user equipment UE is mapped to the symbol in the first half of the downlink data channel, the user equipment UE may perform the demodulation process, using both the reference signal transmitted by the symbol in the first half of the downlink data channel and the reference signal transmitted by the symbol in the second half. In addition, in the case illustrated in FIG. 14(b), the user equipment UE may perform a demodulation and decoding process, using the reference signal transmitted by the symbol in the first half, and then feed back the decoding result (transmit ACK/NACK) to the base station eNB. The following structure may be used: when it is difficult to accurately perform decoding (that is, when NACK is transmitted), the user equipment UE performs the demodulation and decoding process again, using the reference signal transmitted by the symbol in the second half; and when combination and reception by HARQ using data retransmitted from the base station eNB are performed, the user equipment UE combines data that has been subjected to the demodulation and decoding process again with the retransmitted data. In this case, it is possible to improve a block error rate (BLER).

In this embodiment, the base station eNB may not transmit the reference signal, using the symbol to which no downlink data has been mapped. In this case, it is possible to the symbol, to which no downlink data has been mapped, for other purposes (for example, resources for uplink or D2D). In addition, it is possible to prevent the interference between the cells due to the transmission of the reference signal to other cells.

(Other Supplementary Information)

In this embodiment, the base station eNB may instruct a user equipment UE (a user equipment UE that does not correspond to this embodiment) not to transmit a signal (to perform puncture) in a specific symbol or/and a specific frequency resource in the subframe, using an RRC message or downlink control information, in order to enable the coexistence of the user equipment UE that does not correspond to this embodiment. When receiving the instruction, the user equipment UE operates so as not to transmit a signal in the instructed specific symbol or/and frequency resource (to perform puncture).

<Functional Structure>

An example of the functional structure of the user equipment UE and the base station eNB which perform the operations according to the plurality of embodiments will be described.

(User Equipment)

Figure 15:
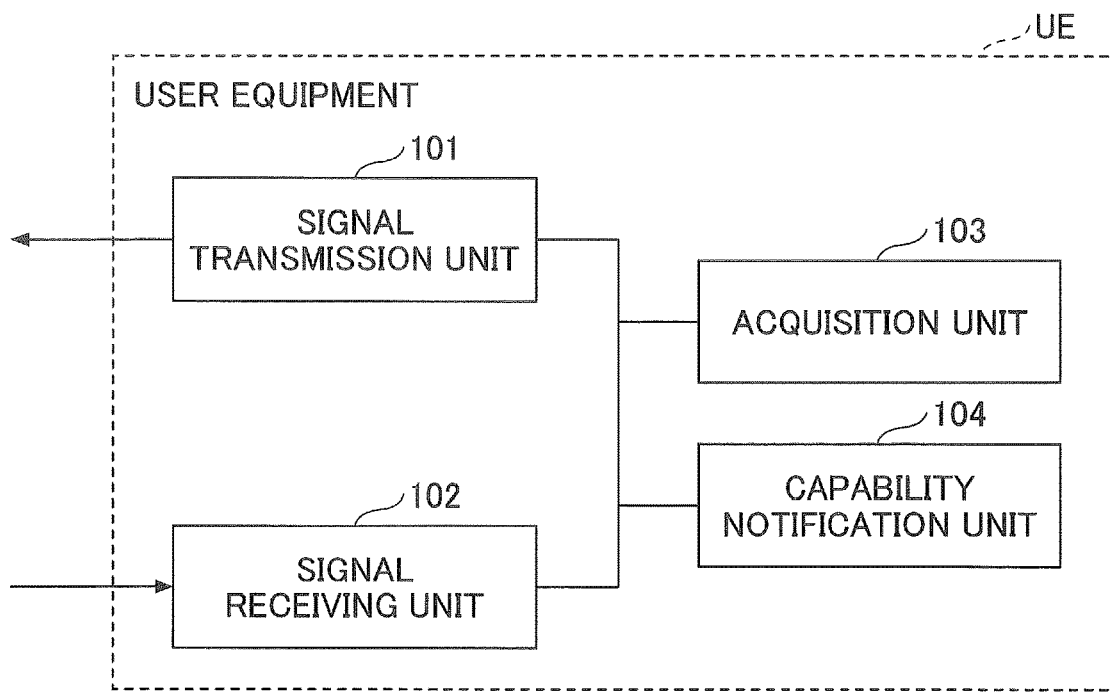
FIG. 15 is a diagram illustrating an example of the functional structure of a user equipment according to the embodiment.

FIG. 15 is a diagram illustrating an example of the functional structure of the user equipment according to the embodiment. As illustrated in FIG. 15, the user equipment UE includes a signal transmission unit 101, a signal receiving unit 102, an acquisition unit 103, and a capability notification unit 104. FIG. 15 illustrates only the functional units of the user equipment UE which are particularly related to the embodiment of the invention and the user equipment UE has at least a function (not illustrated) for performing the operation based on LTE. The functional structure illustrated in FIG. 15 is just an example. The functional units may be classified in any way or may have any names as long as they can perform the operations according to this embodiment. However, some (for example, only one specific modification and embodiment or a plurality of modifications and embodiments) of the above-mentioned processes of the user equipment UE may be performed.

The signal transmission unit 101 has a function of generating various signals in a physical layer from signals in a higher layer which will be transmitted from the user equipment UE and wirelessly transmitting the generated signals. The signal receiving unit 102 has a function of wirelessly receiving various signals from other user equipments UE or the base station eNB and acquiring signals in a higher layer from the received signals in the physical layer. In addition, the signal transmission unit 101 has a function of transmitting an HARQ response to the downlink data received by the downlink data channel at the timing when the HARQ response to the downlink data will be transmitted. The signal receiving unit 102 has a function of receiving an HARQ response to the data transmitted by the uplink data channel or retransmission data scheduling information (UL grant) at the timing when an HARQ response to the uplink data is received.

When retransmission data for the downlink data is not received from the base station eNB until retransmission data for the downlink data is received, the signal receiving unit 102 may delete an HARQ process buffer (for example, soft channel bits) corresponding to the downlink data. The signal receiving unit 102 may change the number of soft channel bits stored in the user equipment UE. In this case, it is possible to use the deleted buffer (bits) for other purposes such as D2D.

The signal receiving unit 102 may increase the number of HARQ processes, using the deleted buffer (bits) (that is, the deleted buffer (bits) may be assigned to a new HARQ process). In this case, it is possible to improve the efficiency of retransmission. In addition, the user equipment UE may autonomously determine the number of HARQ processes to be increased, on the basis of the maximum TB size or symbol assignment, or the base station eNB may configure the number of HARQ processes to be increased in the user equipment UE.

The signal receiving unit 102 may receive the downlink data mapped to one or more segments which are designated by a downlink control signal. In addition, the signal transmission unit 101 may transmit the uplink data, using the resources of one or more segments designated by uplink grant.

When a demodulation process is performed for the downlink data mapped to one or more segments which are designated by the downlink control signal, the signal receiving unit 102 may perform the demodulation process, using the reference signal transmitted by the segment to which downlink data for the user equipment UE has been mapped and the reference signal transmitted by the segment to which downlink data for the user equipment UE has not been mapped.

The acquisition unit 103 has a function of acquiring a resource position where a downlink data channel is mapped or a resource position where an uplink data channel is mapped in a radio frame (for example, a subframe) and information (radio frame configuration information) indicating the timing when an HARQ response to downlink data is transmitted from the user equipment UE or the timing when an HARQ response to uplink data is transmitted from the base station eNB. In addition, the acquisition unit 103 may acquire information indicating the timing when retransmission data for downlink data is received. The acquisition unit 103 may acquire the radio frame configuration information and the information indicating the timing when retransmission data for downlink data is received through an RRC message or a downlink control signal (DCI).

The capability notification unit 104 has a function of transmitting to the base station eNB capability information indicating a combination of a resource position where downlink data is mapped in a radio frame (for example, a subframe) that can be supported by the user equipment UE and the timing when an HARQ response to downlink data can be transmitted from the user equipment UE.

The capability notification unit 104 has a function of transmitting to the base station eNB capability information indicating a combination of a resource position where a downlink data channel is mapped or/and a resource position where an uplink data channel is mapped in a radio frame (for example, a subframe) that can be supported by the user equipment UE and the timing when an HARQ response to downlink data can be transmitted from the user equipment UE or/and the timing when an HARQ response to uplink data or retransmission data scheduling information can be received from the base station eNB.

(Base Station)

Figure 16:
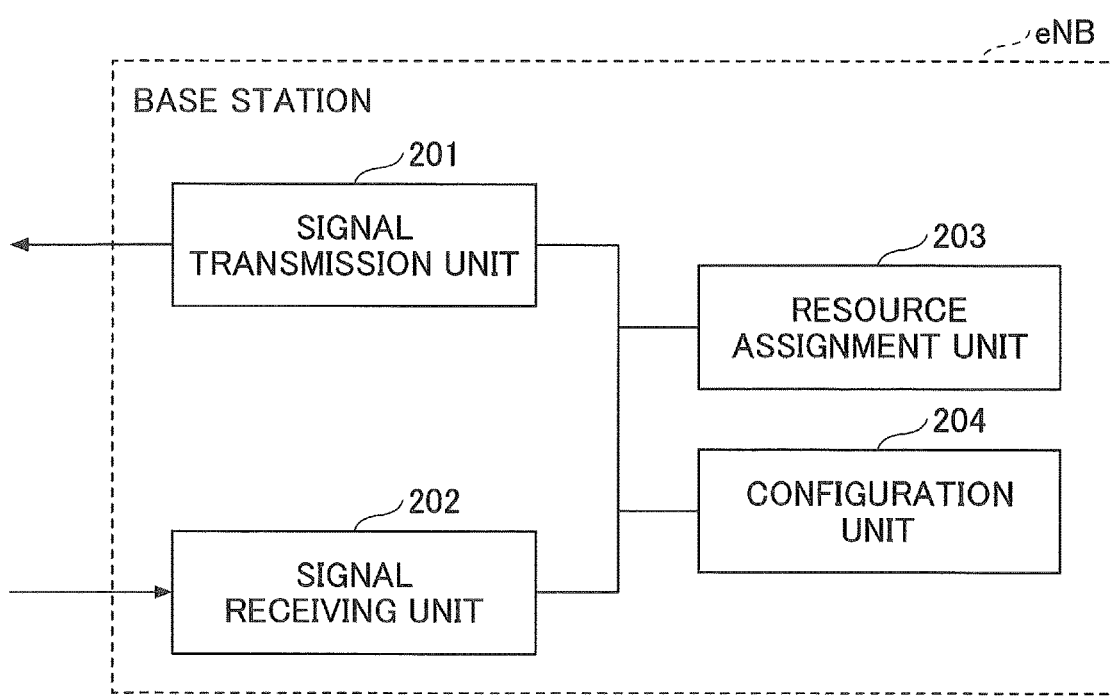
FIG. 16 is a diagram illustrating an example of the functional structure of a base station according to the embodiment.

FIG. 16 is a diagram illustrating an example of the functional structure of the base station according to the embodiment. As illustrated in FIG. 16, the base station eNB includes a signal transmission unit 201, a signal receiving unit 202, a resource assignment unit 203, and a configuration unit 204. FIG. 16 illustrates only the functional units of the base station eNB which are particularly related to the embodiment of the invention and the base station eNB has at least a function (not illustrated) for performing the operation based on LTE. The functional structure illustrated in FIG. 16 is just an example. The functional units may be classified in any way or may have any names as long as they can perform the operation according to this embodiment. However, some (for example, only one specific modification and embodiment or a plurality of modifications and embodiments) of the above-mentioned processes of the base station eNB may be performed.

The signal transmission unit 201 has a function of generating various signals in a physical layer from signals in a higher layer which will be transmitted from the base station eNB and wirelessly transmitting the generated signals. The signal receiving unit 202 has a function of wirelessly receiving various signals from the user equipment UE and acquiring signals in a higher layer from the received signals in the physical layer. In addition, the signal transmission unit 201 and the signal receiving unit 202 have a function of performing an HARQ process. The signal transmission unit 201 may transmit the reference signal in a region to which no downlink data resources are assigned in the downlink data channel or may not transmit the reference signal in the region to which no downlink data resources are assigned in the downlink data channel.

The resource assignment unit 203 has a function of performing a downlink data or uplink data scheduling process in the downlink data channel and the uplink data channel. In addition, the resource assignment unit 203 has a function of performing the downlink data or uplink data scheduling process in the downlink data channel and the uplink data channel which are divided into a plurality of segments.

The configuration unit 204 has a function of configuring, in the user equipment UE, a resource position where a downlink data channel is mapped and a resource position where an uplink data channel is mapped in a radio frame (for example, a subframe) and the timing when an HARQ response to downlink data will be transmitted from the user equipment UE or the timing when an HARQ response to uplink data will be received from the base station eNB. In addition, the configuration unit 204 may determine the resource position where a downlink data channel is mapped and the resource position where an uplink data channel is mapped in a radio frame (for example, a subframe) and the timing when an HARQ response to downlink data will be transmitted from the user equipment UE or the timing when an HARQ response to uplink data will be received from the base station eNB, on the basis of capability information transmitted by the user equipment UE. In addition, when a downlink data channel or an uplink data channel is divided into a plurality of segments, the configuration unit may configure the range of each segment in the user equipment UE.

The entire functional structure of each of the user equipment UE and the base station eNB may be implemented by a hardware circuit (for example, one or a plurality of IC chips). Alternatively, a portion of the functional structure may be implemented by a hardware circuit and the other portion of the functional structure may be implemented by a CPU and a program.

(User Equipment)

Figure 17:
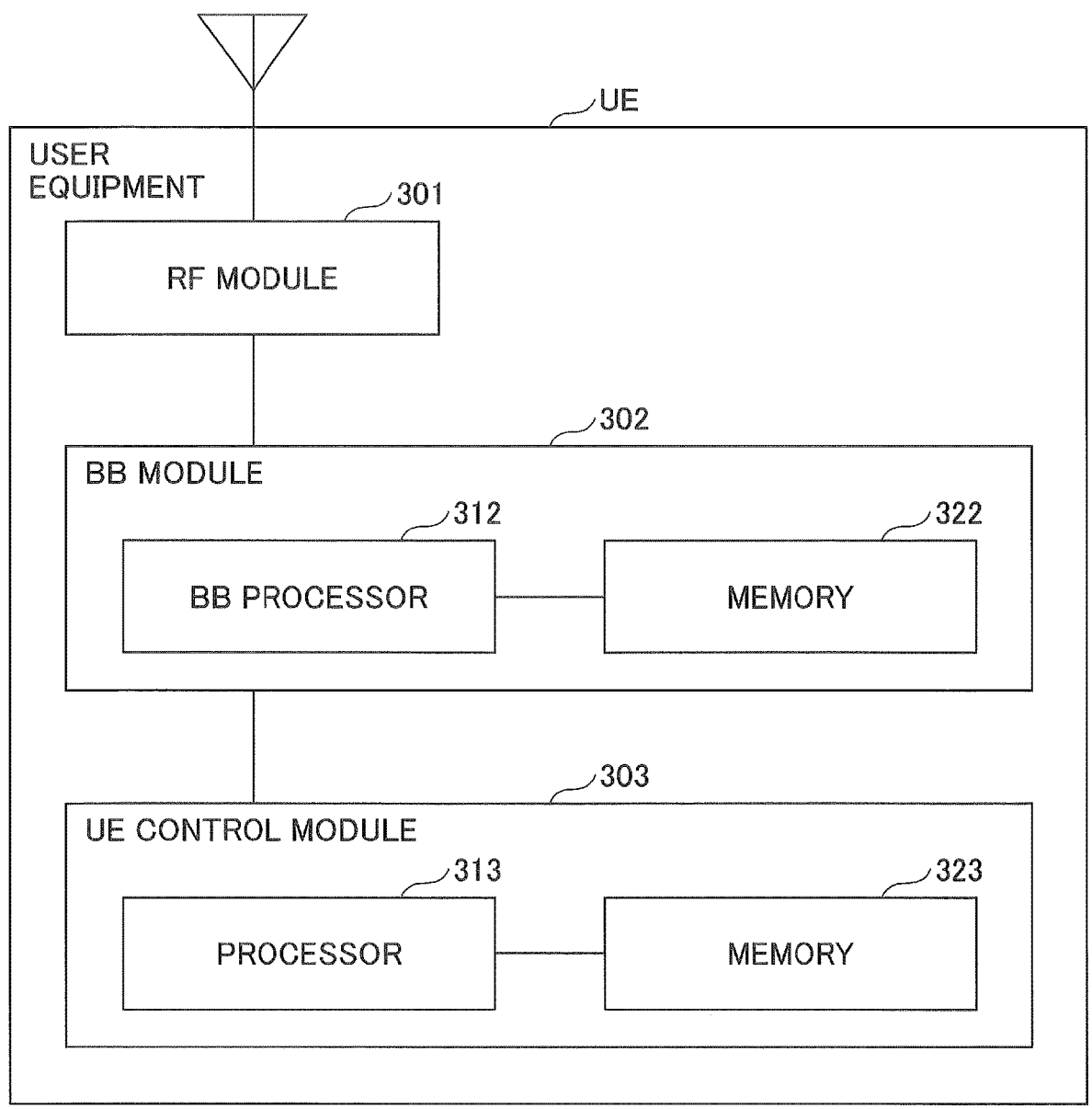
FIG. 17 is a diagram illustrating an example of the hardware configuration of the user equipment according to the embodiment.

FIG. 17 is a diagram illustrating an example of the hardware configuration of the user equipment according to the embodiment. FIG. 17 illustrates a structure that is closer to an implementation example than that illustrated in FIG. 15. As illustrated in FIG. 17, the user equipment UE includes a radio frequency (RF) module 301 that performs a process related to radio signals, a base band (BB) processing module 302 that processes base band signals, and a UE control module 303 that processes, for example, a higher layer.

The RF module 301 performs, for example, digital-to-analog (D/A) conversion, modulation, frequency conversion, and power amplification for the digital base band signal received from the BB processing module 302 to generate a radio signal to be transmitted from an antenna. In addition, the RF module 301 performs, for example, frequency conversion, analog-to-digital (A/D) conversion, and demodulation for a received radio signal to generate a digital base band signal and transmits the digital base band signal to the BB processing module 302. The RF module 301 includes, for example, a portion of the signal transmission unit 101 and the signal receiving unit 102 illustrated in FIG. 154.

The BB processing module 302 performs a conversion process between an IP packet and a digital base band signal. A digital signal processor (DSP) 312 is a processor that performs signal processing in the BB processing module 302. A memory 322 is used as a work area of the DSP 312. The BB processing module 302 includes, for example, a portion of the signal transmission unit 101, a portion of the signal receiving unit 102, and the acquisition unit 103 illustrated in FIG. 15.

The UE control module 303 performs, for example, IP layer protocol processing and various kinds of application processing. A processor 313 performs the processes performed by the UE control module 303. A memory 323 is used as a work area of the processor 313. The UE control module 303 includes a portion of the acquisition unit 103 and the capability notification unit 104 illustrated in FIG. 15.

(Base Station)

Figure 18:
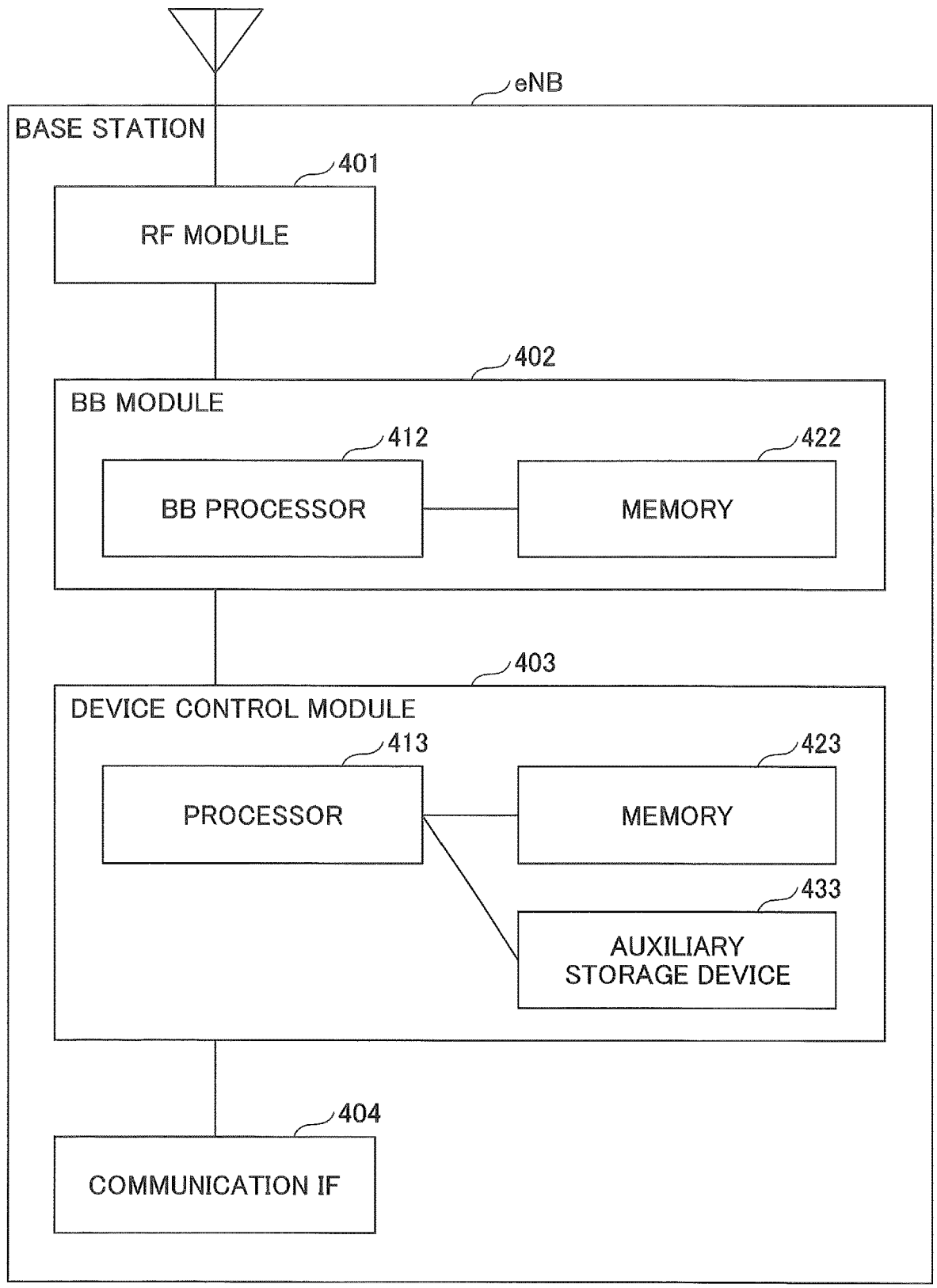
FIG. 18 is a diagram illustrating an example of the hardware configuration of the base station according to the embodiment.

FIG. 18 is a diagram illustrating an example of the hardware configuration of the base station according to the embodiment. FIG. 18 illustrates a structure that is closer to an implementation example than that illustrated in FIG. 16. As illustrated in FIG. 18, the base station eNB includes an RF module 401 that performs a process related to radio signals, a BB processing module 402 that processes base band signals, a device control module 403 that processes, for example, a higher layer, and a communication IF 404 that is an interface for connection to the network.

The RF module 401 performs, for example, D/A conversion, modulation, frequency conversion, and power amplification for the digital base band signal received from the BB processing module 402 to generate a radio signal to be transmitted from an antenna. In addition, the RF module 401 performs, for example, frequency conversion, A/D conversion, and demodulation for a received radio signal to generate a digital base band signal and transmits the digital base band signal to the BB processing module 402. The RF module 401 includes, for example, a portion of the signal transmission unit 201 and the signal receiving unit 202 illustrated in FIG. 16.

The BB processing module 402 performs a conversion process between an IP packet and a digital base band signal. A DSP 412 is a processor that performs signal processing in the BB processing module 402. A memory 422 is used as a work area of the DSP 412. The BB processing module 402 includes, for example, a portion of the signal transmission unit 201, a portion of the signal receiving unit 202, the resource assignment unit 203, and a portion of the configuration unit 204 illustrated in FIG. 16.

The device control module 403 performs, for example, IP layer protocol processing and an operation and maintenance (OAM) process. A processor 413 performs the processes performed by the UE control module 403. A memory 423 is used as a work area of the processor 413. An auxiliary storage device 433 is, for example, an HDD and stores various kinds of configuration information used for the operation of the base station eNB. The device control module 403 may include, for example, a portion of the configuration unit 203 illustrated in FIG. 16.

<Summary>

According to an embodiment, there is provided a user equipment that is provided in a wireless communication system including a base station and the user equipment. The user equipment includes an acquisition unit that acquires information indicating a resource position where a downlink data channel is mapped or a resource position where an uplink data channel is mapped in a radio frame and a timing when an HARQ response to downlink data is transmitted from the user equipment or a timing when an HARQ response to uplink data is received from the base station and a communication unit that transmits an HARQ response to downlink data received by the downlink data channel at the timing when the HARQ response to the downlink data is transmitted and receives an HARQ response to data transmitted by the uplink data channel or retransmission data scheduling information at the timing when the HARQ response to the uplink data is received. According to the user equipment UE, it is possible to appropriately achieve low-delay communication when a radio frame structure in which DL and UL can be flexibly switched is used.

The user equipment may further include a capability notification unit that transmits to the base station capability information indicating a combination of a resource position where a downlink data channel is mapped or a resource position where an uplink data channel is mapped in a radio frame that can be supported by the user equipment and a timing when the HARQ response to the downlink data can be transmitted from the user equipment or a timing when the HARQ response to the uplink data and the retransmission data scheduling information can be received from the base station. According to this structure, the base station eNB can determine a radio frame structure and various kinds of feedback timing according to the processing capability of each user equipment UE in a cell.

The acquisition unit may acquire information indicating a timing when retransmission data for the downlink data is received. When the retransmission data for the downlink data is not received from the base station until the timing when the retransmission data for the downlink data is received, the communication unit may delete a HARQ process buffer corresponding to the downlink data. According to this structure, the user equipment UE can use the deleted buffer for other purposes.

The resource position where the downlink data channel is mapped or the resource position where the uplink data channel is mapped may be divided into a plurality of segments. The communication unit may receive downlink data mapped to one or more segments which are designated by a downlink control signal or transmit uplink data using resources of one or more segments designated by an uplink grant. According to this structure, the user equipment UE can transmit and receive data using each segment. Therefore, it is possible to achieve low-delay communication.

The acquisition unit may acquire information indicating a range of the plurality of segments through an RRC message or the downlink control signal. According to this structure, the base station eNB can change the range of the segment at various timings.

Each of the downlink data items mapped to the plurality of segments may be data obtained by dividing data of one transport block into code blocks that are equal to the number of segments and performing a coding process and a scrambling process for each of the code blocks. According to this structure, it is possible to map one TB to a plurality of segments and the user equipment UE can perform a decoding process for each segment. Therefore, it is possible to achieve low-delay communication.

When a demodulation process is performed for the downlink data mapped to one or more segments which are designated by the downlink control signal, the communication unit may perform the demodulation process, using a reference signal transmitted by a segment to which downlink data for the user equipment is mapped and a reference signal transmitted by a segment to which the downlink data for the user equipment is not mapped. According to this structure, the user equipment UE can improve the accuracy of channel estimation. Therefore, it is possible to achieve high-quality communication.

According to an embodiment, there is provided a communication method that is performed by a user equipment in a wireless communication system including a base station and the user equipment. The communication method includes a step of acquiring information indicating a resource position where a downlink data channel is mapped or a resource position where an uplink data channel is mapped in a radio frame and a timing when an HARQ response to downlink data is transmitted from the user equipment or a timing when an HARQ response to uplink data is received from the base station, a step of transmitting an HARQ response to downlink data received by the downlink data channel at a timing when the HARQ response to the downlink data is transmitted, and a step of receiving an HARQ response to data transmitted by the uplink data channel or retransmission data scheduling information at a timing when the HARQ response to the uplink data is received. According to this structure, it is possible to appropriately achieve low-delay communication when a radio frame structure in which DL and UL can be flexibly switched is used.

<Supplementary Explanation of Embodiment>

The reference signal may be referred to as a pilot signal.

The structure of each device (the user equipment UE/the base station eNB) described in the embodiment of the invention may be implemented by the execution of a program by the CPU (processor) in the device including the CPU and the memory, may be implemented by hardware, such as a hardware circuit including a logic for the processes described in this embodiment, or may be implemented by a combination of the program and the hardware.

The embodiment of the invention has been described above. However, the disclosed invention is not limited to the embodiment and it will be understood by those skilled in the art that various variations, modifications, alterations, and substitutions can be made. Specific numerical examples are used to facilitate the understanding of the invention. However, the numerical values are just examples and any appropriate values may be used, unless otherwise noted. The classification of the items in the above-mentioned description is not essential in the invention and matters described in two or more items may be combined and used, if necessary.

Matters described in an item may be applied to matters described in another item (as long as they do not contradict each other). The boundaries between the functional units or the processing units in the functional block diagram do not necessarily correspond to the boundaries between physical components. The operation of a plurality of functional units may be physically performed by one component. Alternatively, the operation of one functional unit may be physically performed by a plurality of components. In the sequences and the flowcharts described in the embodiment, the order of the processes may be changed as long as there is no contradiction between the processes. For convenience of explanation of the processes, the user equipment UE and the base station eNB have been described, using the functional block diagrams. However, the devices may be implemented by hardware, software, or a combination thereof. The software that is operated by the processor included in the user equipment UE according to the embodiment of the invention and the software that is operated by the processor included in the base station eNB according to the embodiment of the invention may be stored in a random access memory (RAM), a flash memory, a read only memory (ROM), an EPROM, an EEPROM, a register, a hard disk (HDD), a removable disk, a CD-ROM, a database, a server, and other proper storage media.

In the embodiment, the signal transmission unit 101 and the signal receiving unit 102 are an example of a communication unit.

Information transmission (notification, reporting) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, an RRC message may be referred to as RRC signaling. Further, an RRC message may be, for example, an RRC connection setup message, an RRC connection reconfiguration message, or the like.

An aspect/embodiment described in the present specification may be applied to a system that uses LTE (Long Term Evolution), LTE-A (LIE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), other appropriate systems, and/or a next generation system enhanced based thereon.

Determination or judgment may be performed according to a value (0 or 1) represented by a bit, may be performed according to a boolean value (true or false), or may be performed according to comparison of numerical values (e.g., comparison with a predetermined value).

It should be noted that the terms described in the present specification and/or terms necessary for understanding the present specification may be replaced by terms that have the same or similar meaning. For example, a channel and/or a symbol may be a signal. Further, a signal may be a message.

There is a case in which a UE may be referred to as a subscriber station, a mobile unit, subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

An aspect/embodiment described in the present specification may be used independently, may be used in combination, or may be used by switching according to operations. Further, transmission of predetermined information (e.g., transmission of "it is X") is not limited to explicitly-performed transmission. The transmission of predetermined information may be performed implicitly (e.g., explicit transmission of predetermined information is not performed).

As used herein, the term "determining" may encompasses a wide variety of actions. For example, "determining" may be regarded as calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing, comparing and the like. That is, "determining" may be regarded as a certain type of action related to determining.

As used herein, the phrase "based on" does not mean, unless otherwise noted, "based on only". In other words, the phrase "base on" means both "based on only" and "based on at least".

Also, the order of processing steps, sequences or the like of an aspect/embodiment described in the present specification may be changed as long as there is no contradiction. For example, in a method described in the present specification, elements of various steps are presented in an exemplary order. The order is not limited to the presented specific order.

Input/output information, etc., may be stored in a specific place (e.g., memory) or may be stored in a management table. The input/output information, etc., may be overwritten, updated, or added. Output information, etc., may be deleted. Input information, etc., may be transmitted to another apparatus.

Transmission of predetermined information (e.g., transmission of "it is X") is not limited to explicitly-performed transmission. The transmission of predetermined information may be performed implicitly (e.g., explicit transmission of predetermined information is not performed).

Information, a signal, etc., described in the present specification may be represented by using any one of the various different techniques. For example, data, an instruction, a command, information, a signal, a bit, a symbol, a chip or the like described throughout in the present specification may be represented by voltage, current, electromagnetic waves, magnetic fields or a magnetic particle, optical fields or a photon, or any combination thereof.

The present invention is not limited to the above embodiments and various variations, modifications, alternatives, replacements, etc., may be included in the present invention without departing from the spirit of the invention.

The present application is based on and claims the benefit of priority of Japanese Priority Application No. 2016-073463 filed on Mar. 31, 2016, the entire contents of which are hereby incorporated by reference.

EXPLANATIONS OF LETTERS OR NUMERALS

UE USER EQUIPMENT
eNB BASE STATION
101 SIGNAL TRANSMISSION UNIT
102 SIGNAL RECEIVING UNIT
103 ACQUISITION UNIT
104 CAPABILITY NOTIFICATION UNIT
201 SIGNAL TRANSMISSION UNIT
202 SIGNAL RECEIVING UNIT
203 RESOURCE ASSIGNMENT UNIT
204 CONFIGURATION UNIT
301 RF MODULE
302 BB PROCESSING MODULE
303 UE CONTROL MODULE
304 COMMUNICATION IF
401 RF MODULE
402 BB PROCESSING MODULE
403 DEVICE CONTROL MODULE

The invention claimed is:

1. A terminal comprising:
a receiver that receives, according to a downlink control information format, information indicating
a resource position where a downlink data channel is mapped in a radio frame, and
a timing when a HARQ response to downlink data is transmitted from the terminal; and
a transmitter that transmits, at the timing, the HARQ response to the downlink data, the downlink data being received on the downlink data channel,
wherein the information is received on a downlink control channel,
wherein the downlink data and the HARQ response to the downlink data are included in a same subframe,
wherein the downlink data arranged at the resource position where the downlink data channel is mapped is divided into a plurality of segments, and the receiver receives the downlink data mapped to one or more segments which are designated by a downlink control information, and
wherein each of portions of the downlink data mapped to the respective plurality of segments is one of portions of a transport block, the portions of the transport block being obtained by dividing the transport block into code blocks, a number of the code blocks being equal to a number of the plurality of segments, and the receiver performs a decoding process for each of the code blocks.

2. The terminal according to claim 1, wherein:
the receiver receives information indicating
a resource position where an uplink data channel is mapped in a radio frame, and
a timing when a HARQ response to uplink data is received from a base station,
wherein the transmitter transmits data by the uplink data channel, and
wherein the receiver receives, at the timing when the HARQ response to the uplink data is received, at least one of
scheduling information for retransmission data and
a HARQ response to data transmitted by the uplink data channel.

3. The terminal according to claim 1,
wherein the transmitter transmits to a base station capability information indicating a combination of
a resource position where a downlink data channel is mapped or a resource position where an uplink data channel is mapped in a radio frame that can be supported by the terminal, and a timing when the HARQ response to the downlink data can be transmitted from the terminal or a timing when a HARQ response to the uplink data and retransmission data scheduling information can be received from the base station.

4. The terminal according to claim 1,
wherein the receiver receives information indicating a timing when retransmission data for the downlink data is received, and
wherein the transmitter, when the retransmission data for the downlink data is not received until the timing when the retransmission data for the downlink data is received, deletes a HARQ process buffer corresponding to the downlink data.

5. The terminal according to claim 1,
wherein uplink data arranged at a resource position where an uplink data channel is mapped is divided into a plurality of segments, and
the transmitter transmits the uplink data mapped to one or more segments designated by an uplink grant.

6. The terminal according to claim 1,
wherein the receiver receives information indicating a range of the plurality of segments through at least one of an RRC message and the downlink control information.

7. A wireless communication system comprising:
the terminal according to claim 1; and
a base station comprising:
   a second transmitter that transmits, according to the downlink control information format, the information indicating
      the resource position where the downlink data channel is mapped in the radio frame, and
      the timing when the HARQ response to the downlink data is transmitted from the terminal; and
   a second receiver that receives, at the timing, the HARQ response to the downlink data the downlink data being transmitted on the downlink data channel.

8. A communication method of a terminal comprising:
receiving, according to a downlink control information format, information indicating a resource position where a downlink data channel is mapped in a radio frame, and a timing when an HARQ response to downlink data is transmitted from the terminal;
transmitting, at the timing, the HARQ response to the downlink data, the downlink data being received on the downlink data channel,
wherein the information is transmitted via received on a downlink control channel,
wherein the downlink data and the HARQ response to the downlink data are included in a same subframe, and
wherein the downlink data arranged at the resource position where the downlink data channel is mapped is divided into a plurality of segments;
receiving the downlink data mapped to one or more segments which are designated by a downlink control information,
wherein each of portions of the downlink data mapped to the respective plurality of segments is one of portions of a transport block, the portions of the transport block being obtained by dividing the transport block into code blocks, a number of the code blocks being equal to a number of the plurality of segments; and
performing a decoding process for each of the code blocks.

9. A base station comprising:
a transmitter that transmits, according to a downlink control information format, information indicating
   a resource position where a downlink data channel is mapped in a radio frame, and
   a timing when an HARQ response to downlink data is transmitted from a terminal; and
a receiver that receives, at the timing, the HARQ response to the downlink data, the downlink data being transmitted on the downlink data channel,
wherein the information is transmitted on a downlink control channel,
wherein the downlink data and the HARQ response to the downlink data are included in a same subframe,
wherein the downlink data arranged at the resource position where the downlink data channel is mapped is divided into a plurality of segments, and the transmitter transmits the downlink data mapped to one or more segments which are designated by a downlink control information, and
wherein each of portions of the downlink data mapped to the respective plurality of segments is one of portions of a transport block, the portions of the transport block being obtained by dividing the transport block into code blocks, a number of the code blocks being equal to a number of the plurality of segments, and the transmitter performs a coding process for each of the code blocks.

* * * * *